United States Patent
Kimura et al.

[11] Patent Number: 5,936,033
[45] Date of Patent: Aug. 10, 1999

[54] PROCESS FOR PREPARING A ROOM TEMPERATURE CURING ORGANOPOLYSILOXANE COMPOSITION

[75] Inventors: Tsuneo Kimura; Koji Yokoo; Mamoru Teshigawara, all of Gunma-ken, Japan

[73] Assignee: Shin-Etsu Chemical Co., Ltd., Tokyo, Japan

[21] Appl. No.: 08/770,198

[22] Filed: Dec. 19, 1996

[30] Foreign Application Priority Data

Dec. 26, 1995 [JP] Japan ..................... 7-351413

[51] Int. Cl.$^6$ .................................... C08L 83/08
[52] U.S. Cl. .................... 524/864; 524/869; 528/17; 528/29; 528/34
[58] Field of Search .................... 524/863, 864, 524/869; 528/17, 29, 34

[56] References Cited

U.S. PATENT DOCUMENTS

| | | | |
|---|---|---|---|
| 4,261,758 | 4/1981 | Wright et al. | 106/287.12 |
| 4,973,623 | 11/1990 | Haugsby et al. | 524/863 |
| 5,260,372 | 11/1993 | Toporcer et al. | 524/758 |
| 5,525,660 | 6/1996 | Shiono et al. | 524/268 |

FOREIGN PATENT DOCUMENTS

| | | |
|---|---|---|
| 39-022438 | 10/1964 | Japan . |
| 49-005510 | 2/1974 | Japan . |
| 56-000853 | 1/1981 | Japan . |
| 62-135560 | 6/1987 | Japan . |
| 2-041361 | 2/1990 | Japan . |

*Primary Examiner*—Robert Dawson
*Assistant Examiner*—D. Aylward
*Attorney, Agent, or Firm*—McDermott, Will & Emery

[57] ABSTRACT

A method for preparing a room temperature curing organopolysiloxane composition having good working properties, which comprises (A) a diorganopolysiloxane having at least two hydroxyl groups bonded to silicon atoms in one molecule, (B) a thixotropy improver, (C) a finely divided silica powder, (D) at least one member selected from organosilanes having two or more ketoxime groups bonded to a silicon atom in one molecule and partial hydrolyzates thereof, (E) a curing catalyst for the condensation curing reaction between (A) and (D) components, and (F) an amine-based silane coupling agent for imparting adhesiveness to the composition, wherein the (A), (B) and (C) components are first mixed, with which the (D) and (E) components are further mixed, and the (F) component is finally added to and mixed with the resultant mixture.

5 Claims, No Drawings

PROCESS FOR PREPARING A ROOM TEMPERATURE CURING ORGANOPOLYSILOXANE COMPOSITION

BACKGROUND OF THE INVENTION

1. Field of the Invention

This invention relates to the preparation of an organopolysiloxane composition and more particularly, to a process for preparing a room temperature organopolysiloxane composition which is useful as a construction sealant as having good working or laying properties.

2. Description of the Prior Art

As is known in the art, it is usual to fill, with sealants, joint portions such as of concrete blocks and sash window frames and also marginal portions of glass window in various building structures. Examples of the sealant include those made of silicone resins, polysulfites, polyurethanes, acrylic resins, SBR, butyl rubbers or resins and the like. Especially, silicone sealants have been predominantly employed in the fields wherein good bonding properties, heat resistance, weatherability and durability are highly required.

Silicone sealants are usually used such that a composition filled in a cartridge is applied to joint portions and is surface-finished such as with a spatula prior to curing of the composition. For this purpose, the sealant should have non-fluidity and good laying properties.

In order to meet the above requirement, silica fillers are added to the composition at a high filling rate. This presents several problems that the addition of the filler does not proceed smoothly and that the physical properties of the resultant silicone rubber after curing lower.

Japanese Patent Publication No. 39-22438 proposes a silicone rubber composition to which boric acid or alkyl borates are added in order to impart non-sagging properties to the composition. This composition has the problems that when the composition is not thermally treated, satisfactory results are not obtained and a curing reaction is impeded by the addition.

Japanese Patent Publication No. 49-5510 proposes the addition of organic liquids whose vapor pressure is higher than a predetermined level, to a composition comprised of a liquid organopolysiloxane and hydrophobic silica. The organic liquid is inconveniently flammable and volatile, coupled with another problem of toxicity.

In order to improve fluidity, there have been proposed the addition of a polyether compound to a silicone rubber composition (Japanese Laid-open Patent Application No. 56-853) and the addition of a reaction product of a polyether compound and a functional silane to a silicone rubber composition (Japanese Laid-open Patent Application No. 62-135560). Although the addition of the polyether compound or the reaction product is, more or less, effective in improving the fluidity of silicone rubber compositions, a problem commonly arises in that these compositions are poor in working properties. Especially, when subjected to surface finishing with a spatula, the composition sticks on the spatula and is liable to string or rope, thus being difficult to release from the spatula.

Japanese Laid-open Patent Application No. 2-41361 proposes a method wherein non-sagging properties are imparted to a composition without use of any additives. This composition has the problem that cracking is apt to occur in the surfaces thereof on the way of curing of the composition.

SUMMARY OF THE INVENTION

We made intensive studies on the problems of prior art room temperature curable organopolysiloxane compositions. As a result, it was found that a room temperature curing organopolysiloxane composition which is obtained by a specific manner is non-fluid and has good working properties.

It is accordingly an object of the invention to provide a method for preparing a room temperature curing organopolysiloxane composition which is non-fluid in nature and has good working properties without stringing on application thereof.

The above object can be achieved, according to the invention, by a method for preparing a room temperature curing organopolysiloxane composition which comprises:

(A) a diorganopolysiloxane having at least two hydroxyl groups bonded to silicon atoms in one molecule;

(B) a thixotropy improver;

(C) a finely divided silica powder;

(D) at least one member selected from organosilanes having two or more ketoxime groups bonded to a silicon atom in one molecule and partial hydrolyzates thereof;

(E) a curing catalyst for the condensation curing reaction between (A) and (D) components; and (F) an amine-based silane coupling agent for imparting adhesiveness to the composition;

wherein (A), (B) and (C) components are first mixed, with which (D) and (E) components are further mixed and (F) component is finally added to and mixed with the resultant mixture.

DETAILED DESCRIPTION OF THE INVENTION

The diorganopolysiloxane (A) should have at least two hydroxyl groups bonded to silicon atoms in one molecule. Preferably, a diorganopolysiloxane having the following general formula (1) is preferred wherein both ends are blocked with a hydroxyl group $$HO(R^1R^2SiO)_nH \qquad (1)$$

wherein $R^1$ and $R^2$ independently represents a substituted or unsubstituted monovalent hydrocarbon group having from 1 to 10 carbon atoms, preferably from 1 to 8 carbon atoms, and n is an integer sufficient to provide a diorganopolysiloxane whose viscosity at 25° C. ranges from 25 to 1,000,000 centistokes, preferably 1,000 to 100,000 centistokes. Specific examples of the substituted or unsubstituted monovalent hydrocarbon group include alkyl groups such as methyl, ethyl, propyl, butyl and the like, cycloalkyl groups such as cyclohexyl, alkenyl groups such as vinyl, allyl and the like, aryl groups such as phenyl, tolyl and the like, aralkyl groups such as benzyl, phenylethyl and the like, and those groups mentioned above wherein part or all of the hydrogen atoms bonded to the carbon atom or atoms are substituted with a halogen atom, a cyano group or the like, e.g. chloromethyl, trifluoropropyl, cyanoethyl and the like. Of these, methyl or phenyl is preferred. More preferably, methyl is used.

The thixotropy improver (B) is used to impart non-fluidity to the composition. Examples of the improver include polyether compounds such as diethylene glycol, triethylene glycol, polyethylene glycol and the like, and reaction products between the polyether compounds and functional silanes such as chlorosilane, hydrogen silane and the like. These may be used singly or in combination.

The (B) component should preferably be used in an amount of 0.1 to 10 parts by weight, more preferably 0.2 to 5 parts by weight, per 100 parts by weight of the (A)

component. If the amount is less than 0.1 part by weight, non-fluidity may not be satisfactorily imparted to the composition. Over 10 parts by weight, the storage properties of the composition may lower.

The finely divided silica powder (C) is a component of imparting physical strength to the composition after curing. Examples of the silica include fumed silica, calcined silica, precipitated silica, and those silicas mentioned above and subjected to hydrophobic treatment with chlorosilane, silazanes, organosiloxanes or the like. The silica powder should preferably have a specific surface area of not smaller than 50 $m^2/g$, more preferably 100 to 400 $m^2/g$.

The (C) component is preferably used in an amount of from 1 to 50 parts by weight, more preferably from 5 to 30 parts by weight, per 100 parts by weight of the (A) component. If the amount is less than 1 part by weight, the resultant cured product may not have satisfactory strength in some cases. When the amount exceeds 50 parts by weight, the working properties such as the capability of discharging the composition may lower.

The (D) component serves as a crosslinking agent and consists of an organosilane having at least two ketoxime groups bonded to a silicon atom in one molecule and/or partial hydrolyzates thereof. The organic groups other than the ketoxime group and bonded to the silicon atom may be those groups as defined with respect to $R^1$ and $R^2$ in the component (A).

The (D) component is preferably used in an amount of from 3 to 30 parts by weight, more preferably from 5 to 20 parts by weight, per 100 parts by weight of the (A) component. If the amount is less than 3 parts by weight, the stability of the composition may lower and may be gelled during storage thereof. When the amount exceeds 30 parts by weight, shrinkage by curing may become so great that physical properties of a cured product lower.

The (E) component is a curing catalyst which promotes the condensation curing reaction between the (A) and (D) components. Examples of the curing catalyst include organotin compounds such as dimethyldimethoxy tin, dibutyltin diacetate, dibutyltin dioctoate, dibutyltin dibenzylmaleate, dioctyltin diacetate and the like, and organotitanium compounds such as tetraisopropoxy titanium, tetrabutoxy titanium, titanium bisacetonate, and the like.

The (E) component is preferably used in an amount of 0.01 to 5 parts by weight, more preferably from 0.1 to 2.0 parts by weight, per 100 parts by weight of the (A) component. If the amount is less than 0.01 part by weight, the curability of the composition may lower. When the amount exceeds 5 parts by weight, the composition may be cured too rapidly or may lower in strength after curing.

The (F) component is added in order to impart adhesiveness and includes, for example, γ-aminopropyltrimethoxysilane, γ-aminopropyltriethoxysilane, N-β-(aminoethyl)-γ-aminopropyltrimethoxysilane, N-β-(aminoethyl)-γ-aminopropylethyldimethoxysilane, N-phenyl-γ-aminopropyltrimethoxysilane and the like.

The (F) component is preferably used in an amount of 0.01 to 5 parts by weight, more preferably 0.1 to 3 parts by weight, per 100 parts by weight of the (A) component. If the amount is less than 0.01 part by weight, satisfactory adhesiveness may not be obtained. When the amount exceeds 5 parts by weight, the composition may lower in physical properties when cured.

According to the method of the invention, the (A), (B) and (C) components are first mixed together by use of any of various types of kneaders and mixers. If necessary, the mixture may be heated. Thereafter, the (D) and (E) components are further added to and mixed with the mixture. Finally, the (F) component is mixed with the resultant mixture. The mixing of the (D) and (E) components should preferably be carried out in a water-free condition. This is true of the mixing of the (F) component.

If the (A) to (F) components are mixed simultaneously, or if the (F) component is initially mixed with other components, the resultant composition is apt to string or becomes poor in release from a spatula.

The composition of the invention may further comprise known fillers or additives in amounts not impeding the non-fluidity of the composition.

Examples of the filler include reinforcing agents such as carbon powder, talc, bentonite and the like, fibrous fillers such as asbestos, glass fibers, carbon fibers, organic fibers and the like, fillers such as calcium carbonate, zinc carbonate, zinc oxide, magnesium oxide, Celite (diatomaceous earth) and the like, and network polysiloxane resins composed of triorganosiloxy units and $SiO_2$ unit. If present, these fillers are preferably added on mixing of the (A), (B) and (C) components.

Examples of the additives include cold and heat resistance improvers such as red oxide, cerium oxide and the like, dehydrators, rust preventive agents, antibacterial agents, antifungal agents and the like. These additives are preferably added prior to the mixing of the (F) component.

The room temperature curing organopolysiloxane composition obtained according to the method of the invention is non-fluid and is very unlikely to string or rope, with good working properties.

The invention is more particularly described by way of examples and comparative examples, wherein parts are by weight and the viscosity is a measurement at 25° C.

COMPARATIVE EXAMPLE 1

100.0 parts of dimethylpolysiloxane blocked with a hydroxyl group at both ends thereof and having a viscosity of 20,000 centistokes, 1.0 part of triethylene glycol, and 10.0 parts of fumed silica whose surfaces were hydrophobically treated and which had a specific surface area of 110 $m^2/g$ were mixed until a uniform composition was obtained. Subsequently, 6.0 parts of methyltributanoximsilane, 0.1 part of dibutyltin dioctoate and 1.0 part of γ-aminopropyltrimethoxysilane were further mixed with the composition in a water-free condition to obtain sample 1.

EXAMPLE 1

100.0 parts of dimethylpolysiloxane blocked with a hydroxyl group at both ends thereof and having a viscosity of 20,000 centistokes, 1.0 part of triethylene glycol, and 10.0 parts of fumed silica whose surfaces were hydrophobically treated and which had a specific surface area of 110 $m^2/g$ were mixed until a uniform composition was obtained. Subsequently, 6.0 parts of methyltributanoximsilane and 0.1 part of dibutyltin dioctoate were further mixed with the composition in a water-free condition, followed by still further mixing of 1.0 part of γ-aminopropyltrimethoxysilane in a water-free condition to obtain sample 2.

COMPARATIVE EXAMPLE 2

100.0 parts of dimethylpolysiloxane blocked with a hydroxyl group at both ends thereof and having a viscosity of 5,000 centistokes, 1.0 part of polyethylene glycol, and 10.0 parts of fumed silica whose surfaces were hydrophobically treated and which had a specific surface area of 170 m²/g were mixed until a uniform composition was obtained. Subsequently, 8.0 parts of vinyltributanoximsilane, 0.1 part of dibutyltin dibenzylmaleate and 2.0 parts of N-β-(aminoethyl)-γ-amiopropyltrimethoxysilane were further mixed with the composition in a water-free condition to obtain sample 3.

EXAMPLE 2

100.0 parts of dimethylpolysiloxane blocked with a hydroxyl group at both ends thereof and having a viscosity of 5,000 centistokes, 1.0 part of polyethylene glycol, and 10.0 parts of fumed silica whose surfaces were hydrophobically treated and which had a specific surface area of 170 m²/g were mixed until a uniform composition was obtained. Subsequently, 8.0 parts of vinyltributanoximsilane and 0.1 part of dibutyltin dibenzylmaleate were mixed with the composition in a water-free condition, followed by further mixing of 2.0 parts of N-β-(aminoethyl)-γ-amiopropyltrimethoxysilane in a water-free condition to obtain sample 4.

These samples were subjected to a slump test in order to confirm non-fluidity and also to measurement of an amount of discharge in order to confirm working properties according to the methods described in JIS-A-5758, respectively. The results are shown in Table. Moreover, stringing or roping properties were compared in such a way that each composition was filled up in a glass dish having an inner diameter of 27 mm and a depth of 15 mm to make a smooth outer surface. Thereafter, a disk having a diameter of 15 mm was brought into contact with the smooth surface of the composition and pulled up at a rate of 500 mm/minute to determine a string length, with the results shown in Table below.

TABLE

|  | Comparative Example 1 | Example 1 | Comparative Example 2 | Example 2 |
| --- | --- | --- | --- | --- |
|  | Sample 1 | Sample 2 | Sample 3 | Sample 4 |
| Appearance | colorless, semi-transparent paste | colorless, semi-transparent paste | colorless, semi-transparent paste | colorless, semi-transparent paste |
| Slump (mm) | 0 | 0 | 0 | 0 |
| Discharge (g/5 seconds) | 60 | 62 | 79 | 86 |
| String length (mm) | 98 | 36 | 68 | 26 |

What is claimed is:

1. A method for preparing a room temperature curing organopolysiloxane composition which comprises:

(A) a diorganopolysiloxane having at least two hydroxyl groups bonded to silicon atoms in one molecule;

(B) a thixotropy improver;

(C) a finely divided silica powder;

(D) at least one member selected from organosilanes having two or more ketoxime groups bonded to a silicon atom in one molecule and partial hydrolyzates thereof;

(E) a curing catalyst for the condensation curing reaction between compounds (A) and (D); and (F) an amine-based silane coupling agent for imparting adhesiveness to the composition;

wherein the components (A), (B) and (C) are first mixed to form a first mixture, to which components (D) and (E) are further mixed to form a second mixture, to which second mixture component (F) is further mixed to form a resultant mixture.

2. A method according to claim 1, wherein the first mixing is externally heated.

3. A method according to claim 1, where the component (A) consists of a dioganopolysiloxane of the formula $$HO(R^1R^2SiO)_nH$$

wherein $R^1$ and $R^2$ independently represent a substituted or unsubstituted monovalent hydrocarbon group having 1 to 10 carbon atoms, and n is an integer sufficient to provide a viscosity of 25 to 1,000,000 centistokes in 25° C.

4. A method according to claim 1, wherein the components (B), (C), (D), (E) and (F) are, respectively, present in amounts of 0.1 to 10 parts by weight, 1 to 50 parts by weight, 3 to 30 parts by weight, 0.01 to 5 parts by weight, and 0.01 to 5 parts by weight, based on 100 parts by weight of the component (A).

5. A method according to claim 1, wherein the further mixing of components (D) and (E) with the first mixture to form a second mixture, and wherein the further mixing of component (F) with the second mixture to form a resultant mixture, are in a water-free condition.

* * * * *